United States Patent [19]

Carper et al.

[11] Patent Number: 5,577,544
[45] Date of Patent: Nov. 26, 1996

[54] EXTENSION SPRING SYSTEM FOR AN OVERHEAD DOOR

[75] Inventors: Kenneth E. Carper, Madeira; Alan R. Leist, Cincinnati, both of Ohio

[73] Assignee: Clopay Building Products Co., Inc., Cincinnati, Ohio

[21] Appl. No.: 288,328

[22] Filed: Aug. 10, 1994

Related U.S. Application Data

[63] Continuation-in-part of Ser. No. 262,135, Jun. 16, 1994.

[51] Int. Cl.⁶ ................................................. E05F 11/00
[52] U.S. Cl. ................................. 160/191; 49/197; 16/198
[58] Field of Search ................................ 267/69, 73, 277; 160/191, 192, 318; 49/200, 445, 197; 185/39, 44; 16/197, 198

[56] References Cited

U.S. PATENT DOCUMENTS

| | | |
|---|---|---|
| 3,240,484 | 3/1966 | Klamp . |
| 3,860,226 | 1/1975 | Hensiek, Jr. ........................ 267/69 |
| 3,921,761 | 11/1975 | Votroubek et al. . |
| 3,958,367 | 5/1976 | Fairman . |
| 4,003,102 | 1/1977 | Hawks et al. . |
| 4,082,133 | 4/1978 | Halopoff . |
| 4,191,237 | 3/1980 | Voege . |
| 4,301,623 | 11/1981 | Demukai . |
| 4,590,639 | 5/1986 | Fritsche et al. . |
| 4,640,049 | 2/1987 | Duncan . |
| 4,686,739 | 8/1987 | Fritsche et al. . |
| 4,757,853 | 7/1988 | Price . |
| 4,882,806 | 11/1989 | Davis . |
| 4,981,165 | 1/1991 | Miller et al. . |
| 5,036,899 | 8/1991 | Mullet . |
| 5,135,040 | 8/1992 | Ruiter . |
| 5,239,777 | 8/1993 | Husselton . |
| 5,275,223 | 1/1994 | Magro et al. . |
| 5,445,364 | 8/1995 | Tibbals, Jr. ........................ 16/197 X |

*Primary Examiner*—Blair Johnson
*Attorney, Agent, or Firm*—Wood, Herron & Evans, P.L.L.

[57] ABSTRACT

An extension spring overhead door system in which the spring may be quickly and easily placed in tension with the door in a closed position. A spring tensioning device is provided which eliminates the need for multiple installers to lift the full weight of the door and then clamp or otherwise prop the door in an open position. An extension spring containment tube is also provided which surrounds the entire periphery of the spring to fully contain the entire length of the extension spring.

34 Claims, 3 Drawing Sheets

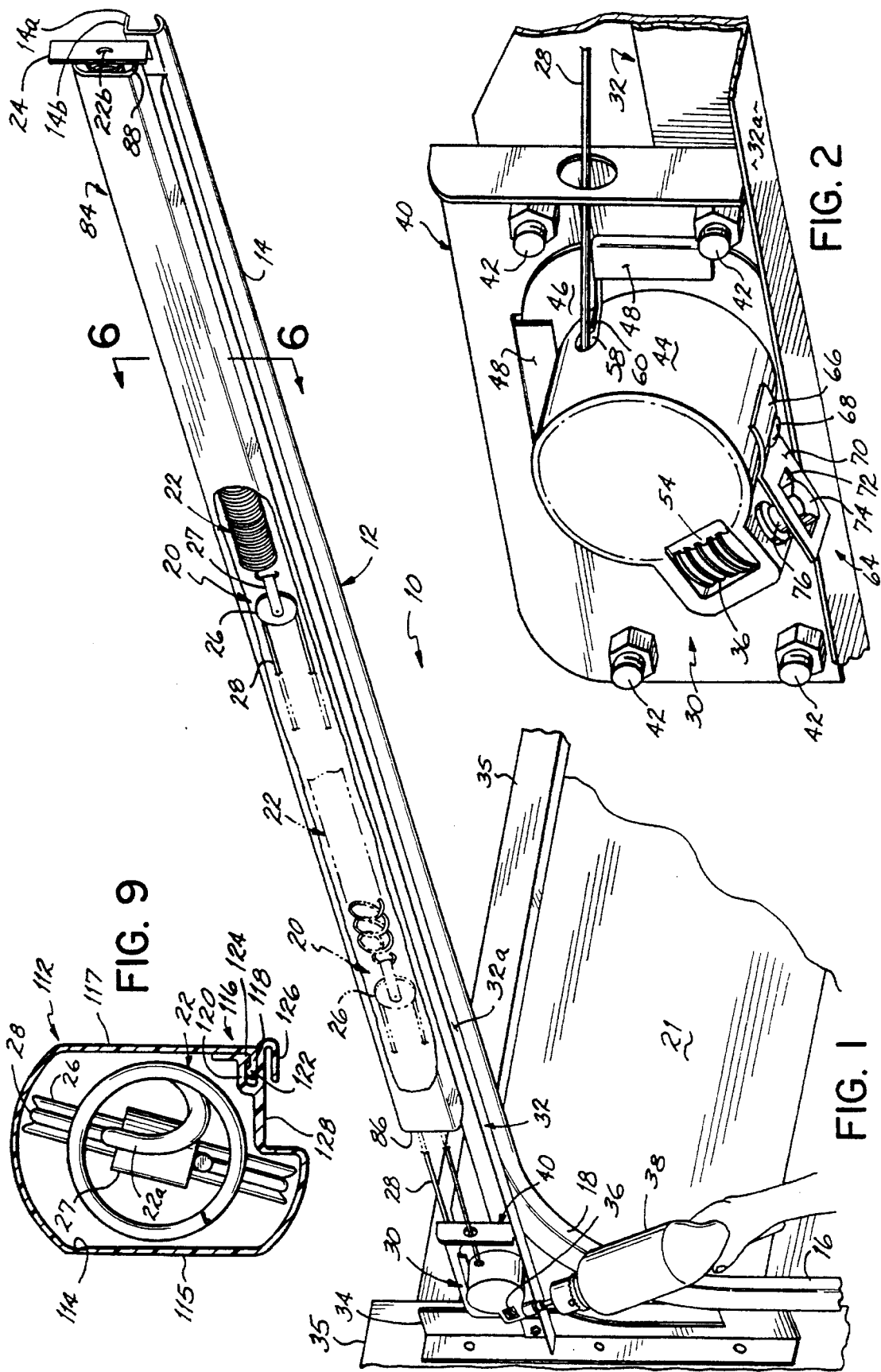

EXTENSION SPRING SYSTEM FOR AN OVERHEAD DOOR

This application is a continuation-in-part application of U.S. patent application Ser. No. 08/262,135, filed on Jun. 16, 1994.

BACKGROUND OF THE INVENTION

This invention generally relates to overhead doors and, more specifically, to an improved tension spring counterbalancing mechanism use in overhead doors, such as residential garage doors.

Overhead doors generally require a counterbalancing force which enables the door to be more easily moved between opened and closed positions either manually or by way of a powered opening device. Often, overhead door systems rely on one or more extension springs, placed in tension when the door is in a closed position, so as to provide the desired counterbalancing force. In tension spring counterbalancing systems, the tension in the spring is released as the door is lifted thereby effectively reducing the weight of the door which must be lifted either by the motor of a door opener or by hand. These extension springs must be stretched or extended during the installation of the overhead door such that they are supplied with the necessary counterbalancing tension.

Presently, the installation of extension spring systems involve labor intensive procedures on the part of the installer. That is, in order for the installer to stretch or extend the spring, the full weight of the overhead door, which may be 200–300 pounds, must be manually lifted and clamped or otherwise propped up in a fully opened position. This procedure usually requires three people, i.e., two people for lifting the door and one more for clamping it in the open position. The operating cable of the door is then attached to the free end of the spring. Since the other end of the spring is fixed, the spring is tensioned when the door is lowered to the closed position. This type of system is not only difficult to install but the door may be inadvertently released from the open position when the spring or springs have not yet been attached to the operating cable. These concerns are amplified by the fact that extension spring systems are often installed by residential homeowners who, in general, are inexperienced with overhead door installation.

Another problem associated with overhead doors utilizing extension spring counterbalancing systems concerns the prevention of damage and/or injury resulting from the spring breaking while under tension. Past solutions to this problem have generally involved the use of a rope or cable passed centrally through the spring. Such safety cables are disclosed in U.S. Pat. Nos. 3,958,367; 4,082,133; and 4,640,049. In theory, spring pieces are meant to remain suspended on the rope or cable if the spring should break under tension. However, there is no guarantee that when a spring under tension breaks, it will break in only one place at a location in which the two remaining pieces of the spring will be adequately suspended on the rope or cable. The spring may, for example be brittle and break into several small pieces which would not be retained by a rope or cable.

U.S. Pat. No. 4,757,853 discloses the combined use of a safety rope extending centrally through the spring and a pair of metal end caps placed over the two ends of the spring. The purpose of the two end caps is stated to be for containment of the extreme ends of the spring through which the safety rope does not extend. While such end caps may provide containment for the ends of the spring, this safety system still does not provide full protection for the entire length of the spring and, in addition, adds undesirable complexity to the overhead door system.

A need in the art therefore exists for improvements in the art of overhead doors employing extension springs. Specifically, an extension spring system is needed which allows easier installation of the overhead door, especially with regard to the procedures involved with supplying counterbalancing tension to the spring. Furthermore, a system is needed which provides for full containment of the extension spring to guard more completely against damage and injury in the event that the spring breaks under tension.

SUMMARY OF THE INVENTION

The present invention therefore provides an extension spring overhead door system in which the spring may be quickly and easily placed in tension with the door in a closed position. The present invention therefore eliminates the need for multiple installers to lift the full weight of the door and then clamp or otherwise prop the door in an open position. The present invention further provides an extension spring containment tube which extends around the entire periphery of the spring to fully contain the entire length of the extension spring. This feature of the invention more completely guards against damage and injury from spring pieces should the spring break under tension.

In general, the present invention provides a method of counterbalancing an overhead door with an extension spring while the overhead door remains in a closed position. The method generally includes the steps of:

1) connecting one end of the extension spring to stationary frame structure;

2) connecting an opposite free end of the extension spring to an operating cable of the overhead door;

3) pulling the operating cable while the door remains closed to stretch the extension spring; and, 4) locking the operating cable after reaching a predetermined stretched spring length.

In accordance with one aspect of the invention, a rotatable spool carries an operating cable of the extension spring system. The operating cable is connected to a free end of the spring while the other end of the spring is fixed to a support frame located generally adjacent an inner end of a horizontal portion of the door track. The spool is mounted for rotation generally adjacent the opposite end of the horizontal track located adjacent the door opening. A rotation and locking mechanism is provided and operatively connected to the spool such that, with the door remaining as installed in its closed position, the spool may be rotated to wind the cable and then effectively locked at a desired position. This stretches or extends the spring to the desired counterbalancing tension and maintains it at that tension with the door closed. Preferably, the spool is rotated by a power tool to make the installation procedure that much easier on the installer.

More specifically, the principles of this first aspect of the invention are preferably embodied in a rotatable spool connected for rotation with a ring-shaped spur gear. In the preferred embodiment, the spur gear and spool are formed integrally from an aluminum alloy. A worm drive gear engages the spur gear and includes a tool engageable nut on one end which allows a power tool to be used to rotate the worm drive gear and thereby rotate the spur gear and spool. The worm drive gear extends downwardly at an angular orientation defined between vertical and approximately 45° to be easily accessed by an installer. The cable extends from the spool around a pulley attached to a free end of the extension spring, over a fixed pulley attached to support structure at the front of the horizontal track section and is finally fixed to the bottom of the door.

The worm drive gear provides a lock against rotation for the spool since it will effectively restrain the spur gear and the spool from rotating after the installation procedure is complete. As an added measure of assurance against rotation of the spur gear and spool after installation, a gear retainer may be used which engages the winding mechanism to restrain the spur gear and worm drive gear from rotating during normal operation of the door. One such gear retainer is disclosed in co-pending related U.S. Pat. application Ser. No. 08/262,135 which is fully and expressly incorporated herein by reference.

In another aspect of the invention, a tubular protective spring cover is provided for fully enclosing at least the entire periphery of the spring and thereby protecting surrounding objects or persons from damage or injury should the spring break under tension. The tubular cover is shaped to allow the pulley attached to the free end of the spring to travel with the tube as the spring is tensioned and untensioned either during the installation procedure or during operation of the door. The cover includes at least one opening along the entire length. This opening includes a closure to allow the cover to be easily installed and removed from the spring. Preferably, the tube is extruded from flexible plastic, such as polypropylene, and includes a shaped profile and retaining means for allowing the cover to be removably affixed to a horizontal portion of the door track. In the preferred embodiment, the cover is biased in a normally open state for easy application to the spring. In another embodiment, the extruded tube includes an integral hinge for allowing easy opening and closing of the tube, for example, during installation and/or removal thereof.

BRIEF DESCRIPTION OF THE DRAWINGS

FIG. 1 is a perspective view of one side of an overhead door system including the extension spring tensioning mechanism and protective spring cover of the present invention;

FIG. 2 is an enlarged perspective view of the tensioning mechanism shown in FIG. 1;

FIG. 9 is a cross sectional view similar to FIG. 6 but showing one alternative embodiment of the tubular protective spring cover.

DETAILED DESCRIPTION OF THE PREFERRED EMBODIMENT

Figure 3:
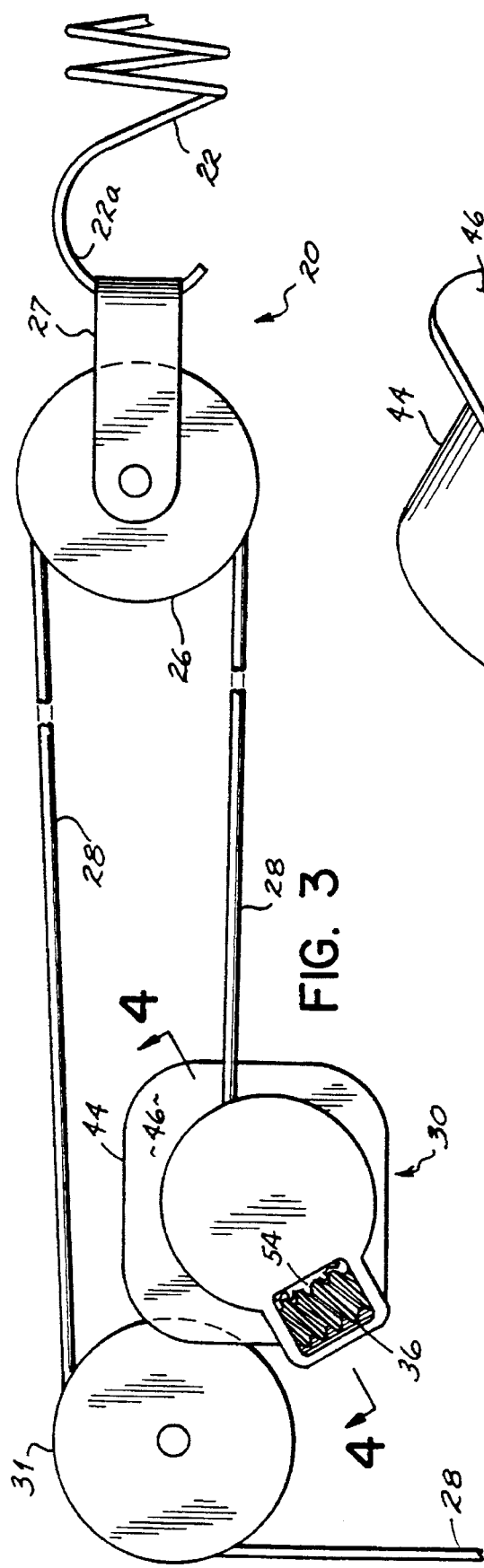
FIG. 3 is a side view schematically showing the connections between the tensioning mechanism and the tension spring of the present invention.

Turning first to FIG. 1, a portion of an overhead door system 10, such as a residential garage door system, is shown and includes conventional door suspending and guiding structure such as a track 12 having a horizontal section 14, a vertical section 16 and a curved section 18. Regarding the incorporation of the present invention into overhead door system 10, a counterbalancing system 20 is provided for at least one side of an overhead door 21 and includes a tension spring 22 connected between a vertical angle bracket 24, which may be rigidly fastened to the ceiling of a garage, and a pulley 26. The connection to pulley 26 is made by way of a mounting bracket 27 which rotatably mounts pulley 26 and also receives a hook-shaped end 22a of spring 22.

In those overhead door applications requiring two tension springs, for example, a counterbalancing system 20 as described below will simply be duplicated on both sides of the door 21 adjacent to each horizontal track section 14. For simplicity, it will be understood that only one counterbalancing system 20 need be described herein.

Referring briefly to FIGS. 1 and 3, an operating cable 28 extends out of a spring tensioning device 30 and around pulley 26. The other end of operating cable 28 is rigidly attached to the bottom of the overhead door 21 in a conventional manner after passing over a second, stationary pulley 31. It will be appreciated that pulley 31 may be fixed to the same mounting plate as tensioning device 30 which is described in more detail below. Spring tensioning device 30 generally operates to wind cable 28 such that, with the door closed, spring 22 may be stretched generally from its initial contracted length as shown in solid in FIG. 1 to a stretched tensioned length shown in phantom in FIG. 1. In this way, spring 22 is placed in tension to assist with the opening of door 21. That is, spring 22 will contract as door 21 is opened and will thereby release the energy that was stored during the tensioning procedure to aid in lifting door 21.

As further shown in FIG. 1, a horizontal angle bracket 32 mounts the tensioning device 30 generally between horizontal track section 14 and a vertical flag bracket 34 which may be rigidly fastened to door frame structure 35 which defines the door opening in a conventional manner. Tensioning device 30 is preferably mounted so that it is disposed outside of track 12 and includes an easily accessible rotatably mounted drive worm 36 for enabling the cable winding and spring tensioning procedure in a manner to be detailed below. Worm 36 may be easily engaged by a power tool 38 held by an installer standing within the garage or other building structure behind door 21. Preferably, worm 36 is oriented between a vertical position and a position extending approximately 45° into the building structure so as to provide for easy accessibility.

As best shown in FIG. 2, a mounting plate 40 formed of sheet metal is rigidly secured to horizontal bracket 32 by bolts 42. Tensioning device includes a housing 44, which may be formed of metal or plastic, having a flange portion 46 for allowing tensioning device 30 to be mounted to plate 40. Specifically, flange portion 46 of housing 44 is secured beneath a plurality of sheet metal retaining lips or tabs 48 extending from an outer side of mounting plate 40. Preferably, there are three such lips or tabs 48, although only two are shown in FIG. 2. Housing 44 of spring tensioning device 30 is initially secured to mounting plate 40 by way of flange portion 46 registering under retaining lips 48 disposed above and on two sides of housing 44. Then, mounting plate 40 is secured to bracket 32 with bolts 42 so that horizontal portion 32a of bracket 32 acts as a fourth retaining means on the lower side of housing 44. Of course, other ways of fastening housing 44 to mounting plate 40 and/or bracket 32 are also contemplated.

Figure 10:
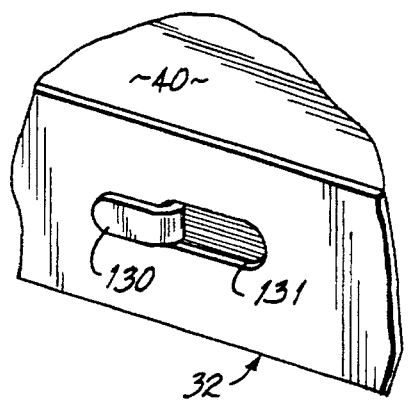
FIG. 10 is a view from the opposite side of the mechanism shown in FIG. 2 illustrating a safety hook for holding the mechanism onto the horizontal door track.

FIG. 10 is a view from the opposite side of the tensioning device 30 illustrating a safety hook 130 for holding the plate 40 secured to bracket 32 when the bolts 42 are removed. The safety hook 130 registers with the slot 131 in bracket 32 by insertion towards the rear door track. Thus, in the event that the bolts 42 are removed when the spring of device 30 is under tension, the safety hook 130 will retain device 30 and prevent it from flying off the bracket 32.

Figure 5:
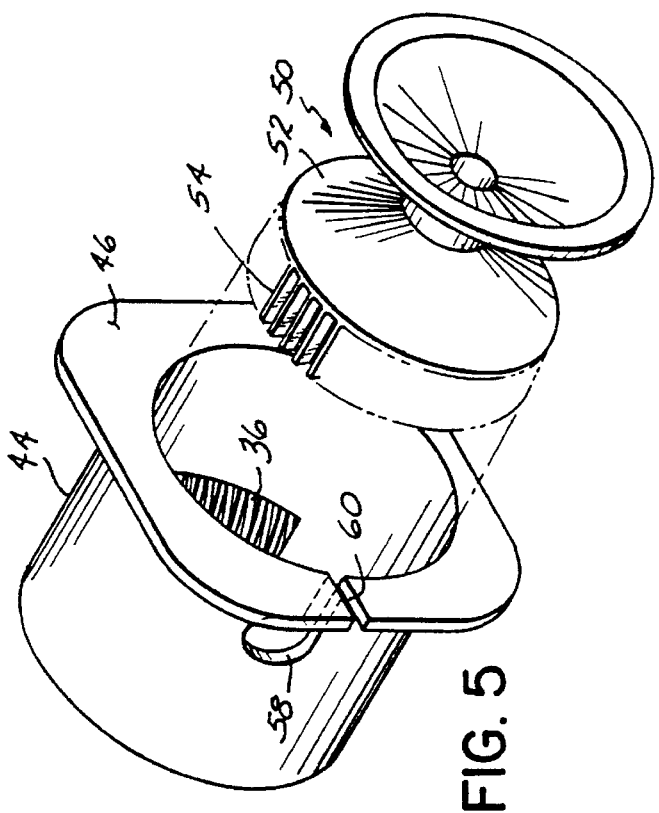
FIG. 5 is an exploded perspective view of the tensioning mechanism diagrammatically illustrating the housing and geared spool of the invention.
Figure 4:
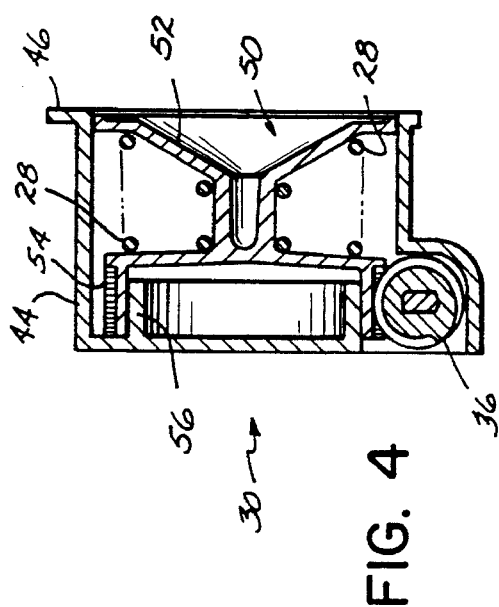
FIG. 4 is a cross sectional view of the tensioning mechanism taken along line 4—4 of FIG. 3.

Turning now to FIGS. 4 and 5, spring tensioning device 30 comprises a geared spool 50 for receiving, winding and unwinding operating cable 28. Geared spool 50 may be integrally molded from a polymeric plastic, aluminum or other plastic material, for example, and includes a spool portion 52 having one end of cable 28 connected thereto and a gear portion 54. Preferably, gear portion 54 is formed as a spur gear, i.e., a ring gear having outer teeth which extend parallel to its axis of rotation. Geared spool 50 is rotatably received within housing 44 by registration of gear portion 54 about an inner hub 56 of housing 44 as shown in FIG. 4. Housing 44 may also be formed from a plastic, and therefore friction between the inside of gear portion 54 and the outside of hub 56 is minimal. Worm 36 may also be formed from an acetal plastic to reduce friction with gear portion 54 of geared spool 50. Geared spool 50 is mounted within housing 44 such that gear portion 54 meshes with worm 36 as shown in FIG. 4. In this way, rotation of worm 36 in one direction will rotate geared spool 50 in a corresponding direction to wind cable 28 about spool portion 52 and rotation of worm 36 in the opposite direction will correspondingly unwind cable 28 from spool portion 52. As further shown in FIG. 5, housing 44 includes a hole 58 and a slot 60 for allowing geared spool 50 to be assembled with housing 44 and cable 28 (FIG. 2) to pass through housing 44.

In another aspect of the invention shown in FIG. 2, a gear retainer 64 is provided for selectively preventing rotation of worm 36 and geared spool 50. Gear retainer 64 operates in a substantially identical manner to the gear retainer disclosed in the above incorporated related application Ser. No. 08/262,135. Specifically, gear retainer 64 comprises a resilient spring clip 66 which is rigidly secured to housing 44 by a fastener 68 and includes an angled, resilient portion 70 extending outwardly from housing 44. Resilient portion 70 of spring clip 66 includes an aperture 72 which normally engages a hex drive head 74 in the clip's unbiased state so as to prevent rotation of worm 36. When resilient portion 70 is pushed inwardly by a tool engaging hex drive head 74, aperture 72 is aligned about stepped down or recessed portion 76 and head 74 is free to rotate. Worm 36 may therefore also be rotated to either wind or unwind operating cable 28 to respectively tension or untension spring 22 (FIG. 1).

Another feature of the present invention is illustrated in FIGS. 1 and 6–8. Specifically, as shown in FIG. 1, a tubular spring cover 84 is provided for surrounding at least the outer periphery of spring 22 when the spring 22 is either at its contracted, untensioned length, shown in solid, or at a stretched or tensioned length as shown in phantom. Cover 84 is preferably formed from polypropylene, PVC, metal or other plastics. As will be appreciated from the illustrated movement of spring 22 and pulley 26 in FIG. 1, cover 84 is dimensioned to allow longitudinal and rotational movement of pulley 26 during tensioning and untensioning of spring 22. While angle member 24 will provide some containment capability for end 88, removable end caps (not shown) may optionally be provided at one or both ends 86, 88 of cover 84 to provide for full containment and protection of spring 22. Of course, suitable apertures would have to be provided in such end caps to allow for passage of cable 28 at end 86 and of the hook portion of spring 22b at end 88.

Figure 6:
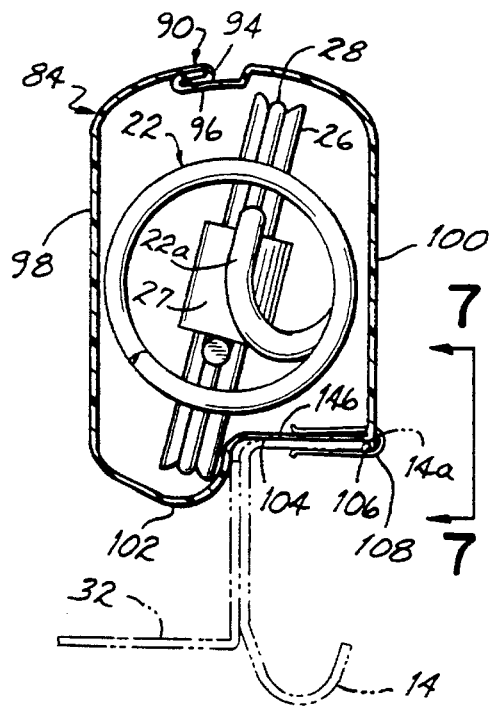
FIG. 6 is a cross sectional view of the tension spring and one preferred embodiment of a tubular protective spring cover taken along line 6—6 of FIG. 1.
Figure 7:
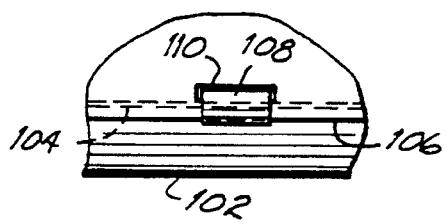
FIG. 7 is a view taken along line 7—7 of FIG. 6 and showing one preferred manner of fastening the cover to a horizontal door track section.
Figure 8:
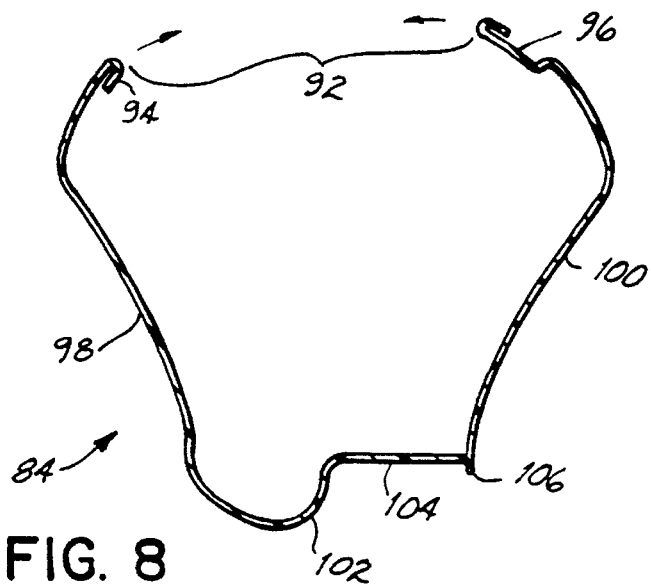
FIG. 8 is a cross sectional view similar to FIG. 6 but showing the preferred spring cover in its normally open state with other structure being deleted for clarity.

Referring now to FIG. 6 taken in conjunction with FIG. 8, cover 84 includes a closure 90 generally defining a resealable opening 92. Specifically, closure 90 comprises a pair of hook-shaped clasp members 94, 96 extending along the entire length of cover 84. Cover 84 is molded or extruded such that two side walls 98, 100 are biased in a normally open condition to expose opening 92 as shown in FIG. 8. A shaped bottom wall 102 is provided for accommodating pulley 26 and includes a planar portion 104 adapted to rest on top of an upper surface 14b of horizontal track section 14. A slight vertically depending edge 106 is further provided for abutting against an upper edge 14a of horizontal track section 14. Finally, as shown in FIGS. 6 and 7, a plurality of clips 108 (only one of which is shown) are provided along the length of cover 84 for fastening cover 84 to horizontal track section 14. Each clip 108 extends through an aperture 110 in cover 84 and clips bottom wall 102 to upper surface 14b of track section 14.

One alternative embodiment for a fully enclosing spring cover is shown in FIG. 9. In this regard, a tubular spring cover 112 is provided for completely enclosing tension spring 22 when it is either in a tensioned, stretched state or in an untensioned, contracted state. Cover 112, like cover 84 of the preferred embodiment, is preferably formed of polypropylene, PVC, metal or other plastics. Cover 112, however, is not molded to be in a normally open position but instead includes an integral hinge 114 extending along an upper edge and a closure 116 extending along a lower edge. Hinge 114 essentially allows two halves 115, 117 of cover 112 to be separated or folded away from each other at closure 116. Closure 116 includes a male portion 118 and a mating female portion 120. Mating portions 118, 120 include respective nubs 122, 124 for maintaining the connection therebetween. Closure 116 allows cover 112 to be opened along its entire length for the purposes of installation and removal of cover 112 or simply accessing spring 22. Cover 112 further includes a retaining lip 126 and a horizontal bottom support surface 128 for allowing removable attachment of cover 112 to horizontal track section 14. In this regard, upper edge 14a (FIG. 1) of horizontal track section 14 may be inserted into retaining lip 126 and support surface 128 may rest on top of the upper surface 14b of horizontal track section 14.

Operation

Referring generally to FIG. 1, after the overhead door system 10 and counterbalancing mechanism 20 have been installed with door 21 in a closed or down position, cover 84 is installed over the stretched spring 22 by releasing closure element 90, if necessary, to expose opening 92 as shown in FIG. 8 and then inserting cover 84 over spring 22. Closure 90 is then snapped closed by engaging clasps 92, 94 with one another. Finally, cover 84 is secured to horizontal track section 14 by clips 108 as shown in FIGS. 6 & 7.

After cover 84 is installed, drive head 74 of worm 36 is engaged with an appropriate tool 38 to disengage gear retainer 64. The installer then rotates worm 36 clockwise as viewed from the perspective of the installer. This rotates geared spool 50 and winds cable 28 about spool portion 52 thereby pulling cable 28 against the force of spring 22 and the weight of door 21 to which the end of cable 28 is attached, This moves pulley 26 toward tensioning device 30 and stretches spring 22 to thereby provide the necessary counterbalancing force for the door through cable 28. Preferably, the length of cover 84 is chosen in conjunction with the necessary tensioned or stretched length of the spring 22 such that the installer can stop stretching spring 22 when pulley 26 is generally flush with end 86 of cover 84 and the spring 22 will thereby be provided with the proper counterbalancing tension.

Although preferred embodiments of the invention have been detailed above, those of ordinary skill in the art will readily recognize modifications thereof and substitutions of various components which do not depart from the spirit of the invention. For example, although a geared spool and worm assembly has been shown and described as the preferred embodiment, it will be appreciated that other conventional components may be substituted for winding the cable and/or stretching the spring in a manner which eliminates the necessity for lifting the full weight of the door and clamping or otherwise propping the door up during installation. In its broader aspects, therefore, the present invention is not limited to a gear and spool arrangement for accomplishing this objective. In addition, it is contemplated that other gear retainers may be utilized for restraining the spool from rotation after the initial tensioning procedure. For example, in the gear system of the preferred embodiment, worm 36 may have a drive bolt extending completely through it in a manner which allows the worm 36 to be selectively tightened down against housing 44 to selectively prevent rotation of worm 36 and geared spool 50. One alternative to the use of selectively operable gear retainer is also contemplated. In this regard, a spring washer may be used between housing 44 worm 36 so as to provide a constant resistance against rotation of worm 36. The force of this resistance is, of course, nevertheless designed to be overcome by deliberate rotation of worm 36 such as with tool 38.

With these and other additions and modifications taken into consideration, it is the Applicant's intent to be bound only by the scope of the appended claims.

What is claimed is:

1. An extension spring system for an overhead door, said system comprising:

an extension spring;

means for mounting a first end of said extension spring;

a door operating cable for connection between said overhead door and a second end of said extension spring; and, a spring tensioning device connected to an end of said cable, said spring tensioning device including a cable winding spool, a rotational mount for said spool and a rotation and locking mechanism operatively connected to said spool for allowing said spool to be rotated and then effectively locked after winding said cable and stretching said extension spring to a desired spring tension.

2. The extension spring system of claim 1 further comprising a first rotatable pulley affixed to said second end of said extension spring for movement therewith during tensioning and untensioning of said spring and a second rotatable pulley affixed to stationary frame structure of said system, said cable extending from said spool and around said first and second pulleys before being attached to said door.

3. The extension spring system of claim 1 wherein said rotation and locking mechanism further comprises a gear system operatively connected to said spool.

4. The extension spring system of claim 3 wherein said gear system comprises a ring-shaped gear connected for rotation with said spool and a worm engaging said ring-shaped gear for rotating said ring-shaped gear and said spool and effectively locking said ring-shaped gear and said spool at a desired position.

5. The extension spring system of claim 4 further comprising a gear retaining spring clip mounted adjacent to a drive head of said worm, wherein an aperture of said spring clip receives and engages said drive head so as to normally restrain any rotation of said drive head and said spring clip is movable to a disengaged position by a tool pressed against said drive head.

6. The extension spring system of claim 3 further comprising a gear retainer which engages said gear system to restrain said gear system from rotating said spool, said gear retainer being essentially disengageable from said gear system to allow operation of said gear system during tensioning and untensioning of said spring.

7. The extension spring system of claim 3 wherein said ring-shaped gear is a spur gear having teeth extending parallel to an axis of rotation of said spur gear.

8. The extension spring system of claim 7 wherein said spur gear and said spool are integrally formed from one material.

9. The extension spring system of claim 8 wherein said one material is a plastic.

10. The extension spring system of claim 1 wherein said rotation and locking mechanism further comprises a housing for rotatably mounting said ring-shaped gear, said spool and said worm to stationary frame structure of said system.

11. The extension spring system of claim 1 wherein said spring includes a tensioned, stretched length and an untensioned, contracted length and said system further comprises a tubular spring cover for fully surrounding said spring at both said tensioned, stretched length and said untensioned, contracted length.

12. The extension spring system of claim 11 wherein said cover includes a flat bottom surface portion adapted to rest on top of a horizontal section of door track and further including at least one fastener for affixing said cover to said horizontal section.

13. The extension spring system of claim 11 wherein said cover includes at least one opening and a closure for selectively exposing said opening and thereby allowing installation and removal of said cover with respect to said spring.

14. The extension spring system of claim 13 wherein said opening extends along the entire length of said cover.

15. The extension spring system of claim 14 wherein said cover is formed of a flexible plastic material capable of being bent to expose said opening.

16. The extension spring system of claim 15 wherein said cover includes a lengthwise hinge which facilitates bending said cover to expose said opening.

17. The extension spring system of claim 14 wherein said cover is formed so as to normally bias said cover to expose said opening and said closure comprises mating fasteners disposed lengthwise along each side of said cover which are engageable with one another to close said opening.

18. The extension spring system of claim 17 wherein said cover is formed from flexible plastic material.

19. The extension spring system of claim 1 further comprising a safety device for preventing removal of said spring tensioning device when said spring is under tension.

20. An extension spring system for an overhead door, said system comprising;

an extension spring adapted to define a tensioned, stretched length and an untensioned, contracted length of said extension spring when operatively connected to said door; and, a tubular spring cover for fully surrounding said extension spring at both said tensioned, stretched length and said untensioned, contracted length, said tubular spring cover having a length that remains the same when the extension spring is at the stretched and contracted lengths and including an opening extending along the entire length of said cover and a closure for selectively exposing said opening to allow installation and removal of said cover with respect to said spring.

21. The extension spring system of claim 20 wherein said cover includes a flat bottom surface portion adapted to rest on top of a horizontal section of door track and further including at least one fastener for affixing said cover to said horizontal section.

22. The extension spring system of claim 20 wherein said cover is formed of a flexible plastic material capable of being bent to expose said opening.

23. The extension spring system of claim 22 wherein said cover includes a lengthwise hinge which facilitates bending said cover to expose said opening.

24. The extension spring system of claim 20 wherein said cover is normally biased to expose said opening.

25. The extension spring system of claim 24 wherein said cover is formed from a flexible plastic material and said closure comprises mating fasteners disposed lengthwise along each side of said cover which are engageable with one another to close said opening.

26. An extension spring system for an overhead door, said system comprising:

an extension spring;

a bracket providing a mounting for a first end of said extension spring;

a door operating cable providing an operative connection between said overhead door and a second end of said extension spring, said cable thereby adapted to exert a pulling force on said extension spring to define a tensioned, stretched length and an untensioned, contracted length of said extension spring when operatively connected to said door; and, a tubular spring cover for fully surrounding said extension spring at both said tensioned, stretched length and said untensioned, contracted length, said tubular spring cover having a length that remains the same when the extension spring is at the stretched and contracted lengths and including an opening extending along the entire length of said cover and a closure for selectively exposing said opening to allow installation and removal of said cover with respect to said spring.

27. The extension spring system of claim 26 wherein said cover includes a flat bottom surface portion adapted to rest on top of a horizontal section of door track and further including at least one fastener for affixing said cover to said horizontal section.

28. The extension spring system of claim 26 wherein said cover is formed of a flexible plastic material capable of being bent to expose said opening.

29. The extension spring system of claim 28 wherein said cover includes a lengthwise hinge which facilitates bending said cover to expose said opening.

30. The extension spring system of claim 26 wherein said cover is normally biased to expose said opening.

31. The extension spring system of claim 30 wherein said cover is formed from a flexible plastic material and said closure comprises mating fasteners disposed lengthwise along each side of said cover which are engageable with one another to close said opening.

32. A method of counterbalancing an overhead door with an extension spring while said overhead door remains in a closed position, the method comprising the steps of:

connecting a first end of said extension spring to stationary frame structure;

connecting a second end of said extension spring to said overhead door while said door remains closed;

stretching said extension spring with a spring tensioning device operatively connected to the second end of said extension spring; and, using a locking device connected with said tensioning device to lock said spring in a stretched position after reaching a predetermined stretched spring length while the door remains closed.

33. A method of counterbalancing an overhead door with an extension spring while said overhead door remains in a closed position, the method comprising the steps of:

connecting a first end of said extension spring to stationary frame structure;

connecting a second end of said extension spring to an operating cable of said overhead door;

pulling said operating cable with a spring tensioning device connected to the second end of said extension spring while said door remains closed to stretch said extension spring; and, using a locking device connected with said tensioning device to lock said operating cable after reaching a predetermined stretched spring length.

34. An overhead door system including an overhead door and an extension spring system, said extension spring system comprising;

an extension spring;

means for mounting a first end of said extension spring; and an operating cable connected between a second end of said extension spring and said overhead door;

spring tensioning means connected to the second end of said spring for stretching said spring to a desired spring tension; and spring locking means connected with said spring tensioning means for locking said spring at said desired spring tension when said door is in a closed position.

* * * * *